US011442163B2

(12) United States Patent
Nohara et al.

(10) Patent No.: US 11,442,163 B2
(45) Date of Patent: *Sep. 13, 2022

(54) DEVICE AND METHOD FOR AN AIRCRAFT BIRD CONGESTION INDICATOR SYSTEM

(71) Applicant: ACCIPITER RADAR TECHNOLOGIES INC., Fenwick (CA)

(72) Inventors: Timothy J. Nohara, Fonthill (CA); Peter T. Weber, Dundas (CA); Graeme S. Jones, Waterloo (CA); Ilia Choly, St. Catharines (CA); Robert Fraser, Welland (CA)

(73) Assignee: ACCIPITER RADAR TECHNOLOGIES INC., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/191,391

(22) Filed: Mar. 3, 2021

(65) Prior Publication Data
US 2021/0190944 A1 Jun. 24, 2021

Related U.S. Application Data

(63) Continuation of application No. 16/108,913, filed on Aug. 22, 2018, now Pat. No. 10,962,643.

(51) Int. Cl.
*G01S 13/933* (2020.01)
*G01S 13/00* (2006.01)
(Continued)

(52) U.S. Cl.
CPC .......... *G01S 13/933* (2020.01); *G01S 13/003* (2013.01); *B64D 2045/0095* (2013.01); *G01S 7/412* (2013.01)

(58) Field of Classification Search
CPC ...... G01S 13/933; G01S 13/003; G01S 7/412; G01S 13/87; G01S 13/726; B64D 2045/0095
See application file for complete search history.

(56) References Cited

U.S. PATENT DOCUMENTS

2017/0301220 A1* 10/2017 Jarrell .................. G05D 1/0022
2018/0164431 A1* 6/2018 Kalyandurg .......... G01S 13/953
(Continued)

FOREIGN PATENT DOCUMENTS

WO WO-2015128478 A1 * 9/2015 ........... A01K 29/005

*Primary Examiner* — Mamadou L Diallo
(74) *Attorney, Agent, or Firm* — R. Neil Sudol; Henry D. Coleman

(57) ABSTRACT

A real-time aircraft bird congestion indicator system for measuring congestion in an airspace between aircraft and birds uses one or more radars to continuously survey an airspace around an airport or aerodrome and continuously generate aircraft tracks and bird tracks in the airspace. A congestion processor connected to the radar(s) receives the aircraft and bird tracks and processes them to periodically generate a congestion indicator that measures the congestion in the airspace. A display processor connected to the congestion processor receives the congestion indicator which is updated periodically by the congestion processor and displays the congestion indicator to a user, generates an alert if the congestion indicator falls outside set operating limits, and/or sends the congestion indicator or alert to another system.

26 Claims, 2 Drawing Sheets

(51) Int. Cl.
*G01S 7/41* (2006.01)
*B64D 45/00* (2006.01)

(56) References Cited

U.S. PATENT DOCUMENTS

2019/0033862 A1* 1/2019 Groden ................ G08G 5/0086
2020/0150226 A1  5/2020 Hamminga ........... A01M 29/16

* cited by examiner

DEVICE AND METHOD FOR AN AIRCRAFT BIRD CONGESTION INDICATOR SYSTEM

FIELD OF THE INVENTION

This invention relates to devices and methods that support safety management systems at airports or other locations where there is a risk that aircraft may collide with birds. The invention is particularly useful for characterizing the congestion between aircraft and birds in the critical airspace used by aircraft, so that action can be taken to reduce risk if congestion thresholds are exceeded.

BACKGROUND OF THE INVENTION

Airports and aerodromes span thousands of acres in extent and birds approaching active runways and critical aircraft flight corridors pose a significant hazard to aviation safety. Billions of dollars in damage to aircraft and significant loss of life have been recorded as the result of birds colliding with aircraft (referred to as bird-aircraft strikes, or simply bird strikes), particularly while aircraft are on approach or departure in the vicinity of airports. Birds do not survive bird strikes.

Avian radars, including 3D avian radars that can detect birds and form tracks representing their trajectories in 3D {x,y,z} versus time, have been developed to characterize where the birds are.

Air traffic control radars (ATC) have been around for years and do an excellent job tracking aircraft in 3D. However, they are not designed to track birds and rather desire to filler them out.

Avian radar and ATC radar do not talk to each other and are not integrated. Hence there is no easy way to overlay where the birds and aircraft are.

It is common today for pilots to hear ATIS messages (Automatic Terminal Information Service) or ATC advisories that indicate that birds are in the vicinity of the airport. But this type of advisory is not actionable or useful because there is no specificity in time or space or severity to characterize risk of a bird strike.

Airports are required to implement safety management systems (SMS) to prioritize, communicate, and mitigate various risks to aviation safety. Bird strike risk today is not yet on the airport's risk map, where it can easily be compared against other risks, because there has been no easy way to provide a leading indicator of this risk across the critical air space.

Bird strike data is very useful in characterizing where strikes have occurred in the past, but is not helpful in telling an airport, pilot, or air traffic controller whether an increasing risk of a bird strike is developing right now, today.

The present invention seeks to overcome the aforementioned limitations by developing a new and practical aircraft bird congestion indicator system that is updated on the fly throughout the day and provides an actionable, leading indicator of bird strike risk throughout the critical airspace that is easy to understand by all stakeholders.

OBJECTS OF THE INVENTION

It is an object of the present invention to provide a system that outputs a leading indicator of bird strike risk throughout an aerodrome that is updated on the fly throughout the day and is actionable.

Another object of the present invention is that the leading indicator of bird strike risk be easy to understand by all stakeholders.

Another object of the present invention is that the leading indicator can be easily integrated into an airport's safety management system.

Another object of the present invention is that the leading indicator can be especially understandable to pilots and air traffic controllers.

A final object of the present invention is that the system that generates and outputs the leading indicator of bird strike risk is affordable and practical to implement at airports.

These and other objects of the invention will be apparent from the drawings and descriptions included herein. It is to be noted that each object of the invention is achieved by at least one embodiment of the invention. However, it is not necessarily the case that every embodiment of the invention meets every object of the invention as discussed herein.

SUMMARY OF THE INVENTION

The present invention concerns a novel system that provides a new and practical aircraft bird congestion indicator that is updated on the fly throughout the day based on changing aircraft and bird utilization of the critical airspace around an airport or other aerodrome. As a result, the invention provides an actionable, leading indicator of bird strike risk that is easy to understand by all stakeholders.

The present invention concerns practical improvements over state-of-the-art bird strike risk indicating systems at airports. These improvements include the following features:

Risk-based by accounting for the relative proximity of birds to aircraft in the airspace Uses current, up to the minute, estimates of aircraft and bird utilization Automatically calculated indicator so that it is not labor intensive Easy to understand and can be used by all stakeholders, especially pilots and air traffic controllers who are extremely busy Can easily integrate with an airport's safety management system Inexpensive and incremental to current systems In accordance with the present invention, a real-time aircraft bird congestion indicator system for measuring congestion in an airspace between aircraft and birds comprises: (a) one or more radars configured to continuously survey said airspace and continuously generate aircraft tracks and bird tracks in said airspace; (b) a congestion processor operatively connected to said one or more radars, said congestion processor configured to receive said aircraft tracks and said bird tracks and process them to periodically generate a congestion indicator that measures the congestion in said airspace; and (c) a display processor operatively connected to said congestion processor, said display processor configured to receive from said congestion processor said congestion indicator which is updated periodically by said congestion processor, said display processor further configured to perform at least one action taken from the group of: (i) display said congestion indicator to a user: (ii) generate and display an alert if said congestion indicator falls outside set operating limits; and (c) send said congestion indicator or said alert to another system.

A related method for measuring congestion in an airspace between aircraft and birds in real-time, in accordance with the present inventions, comprises: (a) operating one or more radars to continuously survey said airspace and continuously generate aircraft tracks and bird tracks in said airspace; (b) operating a congestion processor to receive said aircraft tracks and said bird tracks from said one or more radars and processing them to periodically generate a congestion indicator that measures the congestion in said airspace; (c) operating a display processor to receive from said congestion processor said congestion indicator which is updated periodically by said congestion processor, said display processor further performing at least one action taken from the group of: (i) displaying said congestion indicator to a user; (ii) generating and displaying an alert if said congestion indicator falls outside set operating limits; and (iii) sending said congestion indicator or said alert to another system.

Presently, systems that are deployed either provide bird activity information or aircraft activity information for situational awareness; but joint presentation for the purpose of understanding the real-time risk of bird strikes is not available. This deficiency is overcome with the present invention by using both aircraft tracks and bird tracks jointly in the congestion indicator calculation. Furthermore, the risk of a bird strike is predicated on the proximity of birds to aircraft in the airspace. Just the presence of birds in the vicinity of an airport may not present a risk if they are well-separated from the aircraft.

Another novel benefit of the present invention is the automation associated with the congestion indicator, which overcomes the intensive labor associated with existing systems. Those involved in aviation safety understand that there is little one can do to mitigate the risk associated with a single bird or flock of birds flying across an active runway. Rather, we propose herein that what is needed is the ability to know when there is recurring or persistent use of a critical airspace by both aircraft and birds during a particular period of time, where action could be taken to reduce the risk of bird strikes. This knowledge requires real-time awareness of the amount of joint utilization by both birds and aircraft (we refer to this joint utilization herein as congestion) within small subspaces (herein referred to as cells) distributed throughout the airspace. For a given instant in time, this congestion needs to be measured by considering not only the bird and aircraft tracks at that instant, but also the use of each subspace by birds and aircraft during an immediately preceding window or duration of time.

The congestion indicator calculation, in accordance with the present invention, uses both dynamic aircraft and bird information and their relative proximity to calculate a measure or index that is related or proportional to risk. Various different functions and implementations known to those skilled in the art could achieve this. For example, linear functions that sum components or multiplicative functions that multiply or divide them could be used without changing the essence of the present invention.

The congestion indicator calculation, in a preferred embodiment, is proportional to the sum, over the said airspace, of the cell-to-cell products of three factors: i) an aircraft density function, ii) a bird density function, and iii) a proximity function that is inversely proportional to their respective cell-to-cell separations in the airspace. A preferred approach for estimating the aircraft density function is to use the density of aircraft tracks associated with each cell. Similarly, a preferred approach for estimating the bird density function is to use the density of bird tracks associated with each cell. Indeed, other approaches for estimating the aircraft and bird density functions know to those skilled in the art, including prior knowledge, are contemplated within the scope of the present invention.

The congestion indicator of the present invention is easy to understand and can be used by all stakeholders, especially pilots and air traffic controllers who are extremely busy, because it is based on something they are all familiar with: separation. Pilots maintain separation between their aircraft and other aircraft and ground structures. We extend this intuitive safety concept to aircraft-bird separation; the greater the separation, the less the congestion and the greater the safety with respect to bird strikes.

The obvious way to incorporate separation into a congestion indicator is to base it on a near miss which is familiar to pilots, ATC and wildlife controllers alike. These professionals report near misses into federal databases that analyze bird strikes. A near miss occurs when a particular bird or flock and a particular aircraft almost collide. Measuring the separation or closest point of approach between an aircraft and a bird would be one way upon which to base a congestion indicator.

A preferred and novel approach, in accordance with the present invention, to incorporate separation into the congestion indicator calculation is based on the idea of dividing up the airspace into small subspaces, measuring the congestion between aircraft and birds associated with each subspace, and then summing or averaging (or using an ordered statistic or other normalizations known to those skilled in the art) over all subspaces to compute a single congestion value or separation index associated with the entire airspace. While a near miss would involve a bird and aircraft in the same subspace at the same time, our method also uses a generalized definition of separation based on proximity (i.e. the separation between subspaces utilized by birds and aircraft) to include birds that pass near or through a particular subspace several seconds or even minutes before or after an aircraft passes through the same subspace. For each aircraft subspace/bird subspace pair used in the congestion calculation, the pairwise component of congestion is proportional to the product of the aircraft density and the bird density in the respective subspaces and inversely proportional to separation between the subspaces, so that closer interactions between birds and aircraft and higher traffic densities are associated with higher risk.

In accordance with our invention, the congestion indicator is a leading indicator of bird strike risk because it is designed to trend with increased risk over the airspace, increasing as separation between birds and aircraft decreases throughout the airspace and as abundance of birds and flight operations increases within the airspace. Furthermore, unlike bird strikes which are relatively very rare and not leading, and near misses which are leading but relatively infrequent, our congestion indicator is leading with plenty of data support based on bird and aircraft tracks. As a result, the invention can easily integrate with and support an airport's safety management system.

In one embodiment of the present invention, at least one avian radar is used to generate the required bird tracks, and an air traffic control (ATC) radar is used to generate the aircraft tracks. The avian radar is preferably a 3D avian radar that generates bird tracks in the airspace, with each of the bird tracks specified respectively with coordinates {x, y, z, t} where x, y and z define a Cartesian coordinate system and t represents the current time.

Those skilled in the art will appreciate that {x,y,z} defines a geographic coordinate system that could be specified in linear dimensions, or could equally be {latitude, longitude, altitude} or even in polar or spherical coordinates without changing the invention. 2D avian radars known to those skilled in the art could also be used but are not preferred because of the very suboptimal results that will result when calculating separation between birds and aircraft described hereinafter.

In another embodiment, an Automatic Dependent Surveillance Broadcast (ADS-B) system could generate the aircraft tracks in place of an ATC radar.

In another embodiment, known and prescribed flight routes for departure and approach, as well as information on the current runway use, could be used to build a synthetic density map to add to or supplant aircraft tracks within the calculation of the congestion indicator. This would primarily be used in the event of a sparsity of information as regards to aircraft movements and tracks in the vicinity of the airport. In a suboptimal embodiment, a synthetic density map could be created using historical radar tracks.

In a preferred embodiment, the 3D avian radar is configured to generate both the bird tracks and aircraft tracks for even greater performance, due to the enhanced resolution and update rate of avian radars in comparison to typical ATC radars and ADS-B systems. The 3D avian radar is configured to generate two channels of track data, one channel for generating bird tracks and the second channel for generating aircraft tracks, with updates occurring on the order of seconds (e.g. every 1 to 3 seconds). Each channel's signal processing, detection processing and track processing can be tuned using methods known to those skilled in the art to optimize respective performance for the generation of bird tracks and aircraft tracks.

A particular feature of the congestion indicator is the manner in which the indicator output (also referred to as an update) is generated in time, and the extent of recent bird and aircraft track data that are used in the congestion indicator calculation at any particular update instant. It is typically desired that indicator updates are calculated by the system on the order of every minute or so, allowing the indicator to be responsive to changes in airspace congestion. For each calculation of a congestion indicator update, the most recently received aircraft tracks and bird tracks, each type covering a respective duration on the order of tens of minutes, are used in the calculation. The duration used for the bird tracks need not be the same as the duration used for the aircraft tracks. For example, at time t, the bird tracks used in the calculation may be taken from $t-T_b$ to t where $T_b=10$ minutes, while the aircraft tracks may span $t-T_a$ to t where $T_a=20$ minutes.

Another feature of the present invention is its ability to leverage state-of-the-art, 3D avian radars as well as existing ATC radar and ADS-B systems through integration and incremental modifications. As a result, the marginal cost, over and above these existing systems, is anticipated to be modest.

The aforementioned aircraft bird congestion indicator system in accordance with the present invention is described further below in relation to the figures which detail particular embodiments. The aforementioned and other novel features of the present invention will become apparent in the sequel.

DETAILED DESCRIPTION

Figure 1:
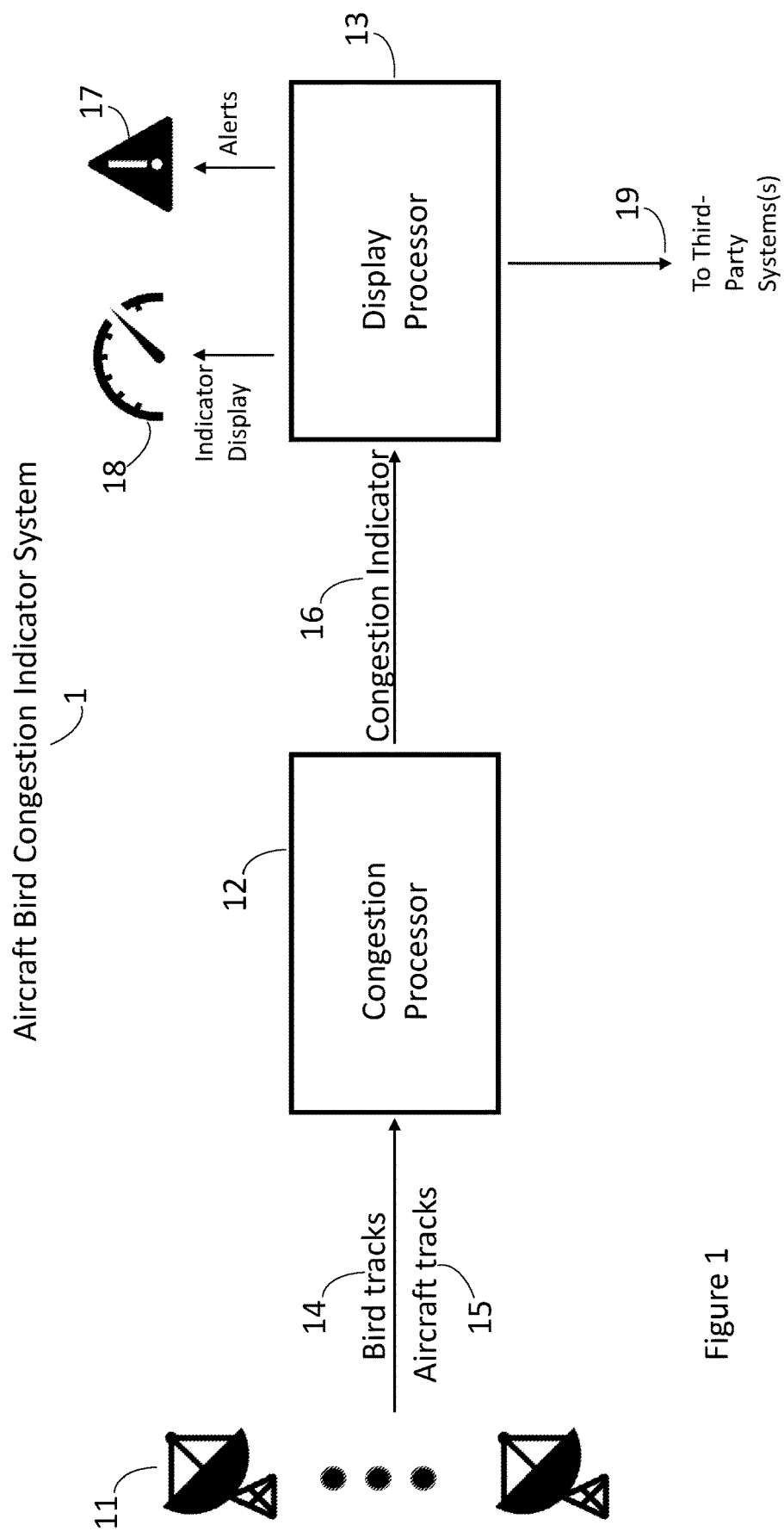
FIG. 1 is a block diagram of the aircraft bird congestion indicator system in accordance with this invention.

An aircraft bird congestion indicator system 1 in accordance with the present invention is illustrated in FIG. 1. One or more radars 11 generate bird tracks 14 and aircraft tracks 15 that feed congestion processor 12 with real-time tracks of birds and aircraft in the airspace. Congestion processor 12 generates a congestion indicator 16 periodically, typically in accordance with a set update rate (e.g. once a minute). The congestion indicator 16 is operated on by display processor 13 which interfaces to users or third-party systems 19. Display processor 13 provides users with an indicator display 18 that presents the congestion indicator 16 in an easy to understand format, and/or alerts 17 which occur when the congestion indicator crosses pre-set thresholds.

Those skilled in the art will appreciate that the one or more radars 11 could be any type of radar capable of generating aircraft tracks 15 and bird tracks 14 in the airspace. For example, one avian radar and one air traffic control radar could be used. The aircraft tracks 15 could also be generated from an Automatic Dependent Surveillance Broadcast (ADS-B) system. A 3D avian radar, exemplarily that disclosed in U.S. Pat. No. 9,291,707, is preferably used to generate high quality bird tracks. A state-of-the-art 3D avian radar that is configured to generate two channels of track data, one channel configured for bird tracks and the other channel configured for aircraft tracks is also preferred, in order to reduce cost and match both resolution and track update rates throughout the airspace. The update rate associated with the aircraft tracks and bird tracks is preferably on the order of seconds.

For the case of 3D radars, aircraft tracks 15 and bird tracks 14 can be geolocated in the airspace using any convenient three-dimensional coordinate system. For example, the tracks can be specified respectively with coordinates {x, y, z, t} where x, y and z define a Cartesian coordinate system and t represents time.

For a given update for congestion indicator 16, the congestion processor 12 preferably processes a contiguous block of the most recent aircraft tracks 15 and bird tracks 14 received immediately prior in time to the current update time. This block of track data preferably spans an interval of time on the order of tens of minutes. The aircraft block and bird block need not be the same duration and are specified to generate sufficient data to support the aircraft density and bird density calculations illustrated in FIG. 2.

Figure 2:
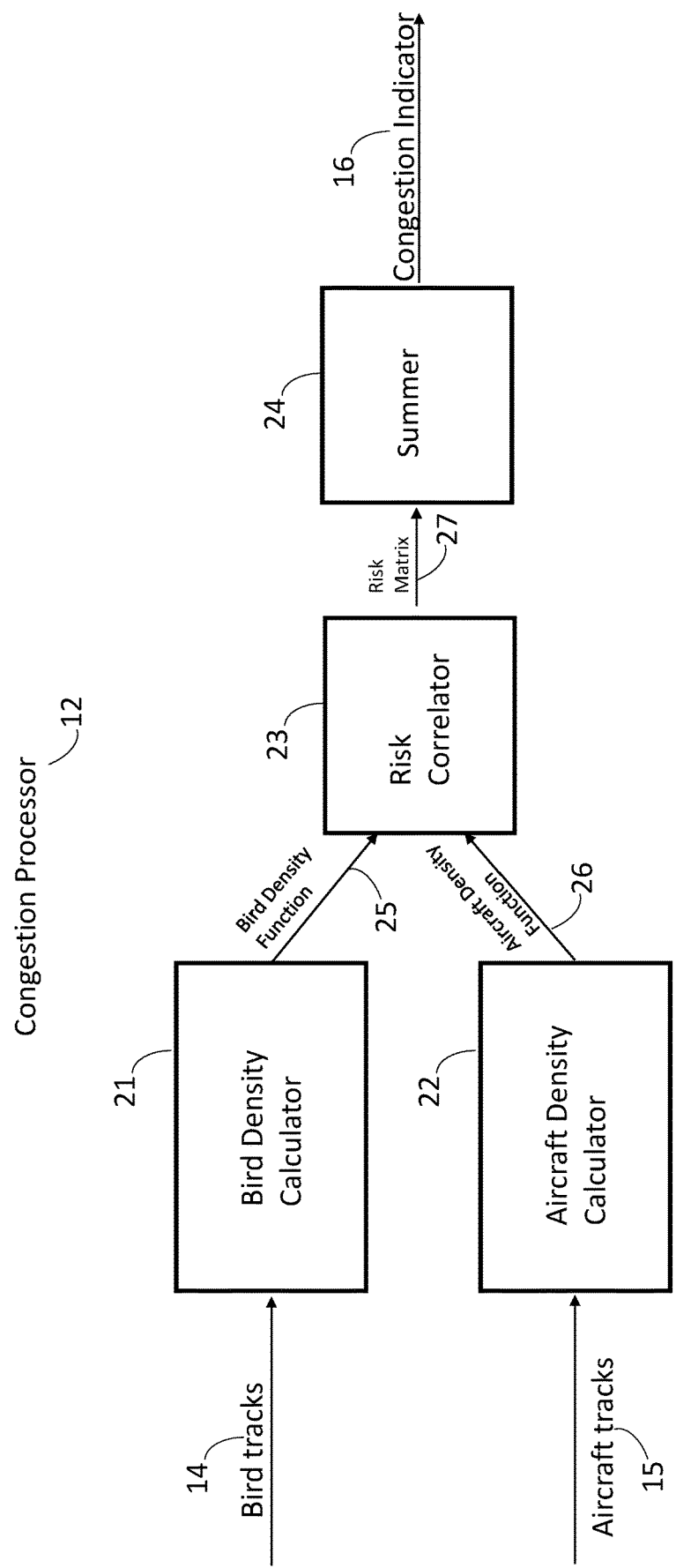
FIG. 2 is a block diagram of a preferred embodiment of the congestion processor in accordance with this invention.

Congestion processor 12 is further illustrated in FIG. 2 where a preferred embodiment is shown. For each congestion indicator 16 update, bird tracks 14 are used by bird density calculator 21 and aircraft tracks 15 are used by aircraft density calculator 22 to calculate respective bird density function 25 and aircraft density function 26. In accordance with the invention, we divide the airspace into subspaces or cells in three spatial dimensions, and calculators 21 and 22 calculate the respective densities on a cell by cell basis.

In a first embodiment, the respective cell-wise density function (25 or 26) for a given update time is determined by counting the number of respective tracks contained within the respective block of track data that intersects or passes through the respective cell. A risk correlator 23 generates risk matrix 27 by multiplying the densities of all possible cell-pairs of the computed aircraft density and bird density functions and then further multiplying these products by a proximity function that is inversely proportional to the respective cell-to-cell separation in the airspace. Risk matrix 27 represents the cell-wise risk in the airspace. When summed by summer 24, risk matrix 27 reduces to a single congestion indicator 16, which is a single number representing the current risk of a bird strike across the entire airspace.

In other words, risk correlator 23 generates risk matrix 27 by computing, for each given cell or subspace of the entire aerodrome space, a sum of products of (i) the aircraft density of that given cell, (ii) the bird density of each of the other cells or subspaces, and (iii) a proximity function that is inversely proportional to the separation or distance between the given cell and the respective other cell in the airspace or aerodrome space. This sum represents, for the given cell, a respective cellular congestion index. Summer 24 adds together all of the cellular congestion indices over the entire airspace to derive the singular congestion indicator 16 representing the current risk of a bird strike across the entire airspace.

Equivalently, risk correlator 23 generates risk matrix 27 by computing, for each given cell or subspace of the entire aerodrome space, a sum of products of (i) the bird density of that given cell, (ii) the aircraft density of each of the other cells or subspaces, and (iii) a proximity function that is inversely proportional to the separation or distance between the given cell and the respective other cell in the airspace or aerodrome space. This sum represents, for the given cell, a respective alternative cellular congestion index. Summer 24 adds together all of the alternative cellular congestion indices over the entire airspace to derive the same singular congestion indicator 16 representing the current risk of a bird strike across the entire airspace.

Should the congestion indicator 16 exceed a predetermined threshold or magnitude of acceptable risk, steps may be taken to compare the cellular congestion indices to determine whether a particular region of the entire airspace is subject to an unacceptable degree of bird strike risk. Steps may then be taken in the routing of air traffic to avert avian collisions.

The proximity function can take a number of forms familiar to those skilled in the art. A simple embodiment has the proximity function monotonically decreasing with the 3D separation between the respective cells. A preferred embodiment has the proximity function equal to the product of two factors: i) a factor monotonically decreasing with the height separation between the respective cells, and ii) a factor monotonically decreasing with the lateral separation between the respective cells.

An important feature of the present invention is the ability to rapidly determine where in the airspace the congestion lies that is responsible for congestion indicator 16 exceeding a risk threshold. Risk matrix 27 contains the cell-wise risk components. As a result, visualization tools such as heat maps or automated algorithms that extract regions in the airspace with continuous high-risk components can rapidly alert users to problem areas in the airspace so that action can be taken to mitigate risk. This feature can also drive automated messaging and advisories such as ATIS messages that not only indicate the aerodrome congestion indicator but also the nature of the congestion. For example, if risk matrix 27 is approximately uniform, the message might read "aircraft bird congestion high throughout the critical airspace". Alternatively, if concentrations of risk occur in the departure corridor of runway 24L and 24R due to migrating birds between 500-1500 feet AGL, the message might read "aircraft bird congestion high in runway 24 departure corridor 500' to 1500' AGL".

Another feature in accordance with the present invention is a congestion advisory system that organizes (for example by year, month, day, hour) and stores congestion indicator 16 and risk matrix 27 in a suitably designed database management system with a user-friendly front-end that makes it easy for users to understand historical aircraft bird congestion at an airport. Airport operators, SMS managers, wildlife control personnel, airlines and flight dispatchers, and regulators could make excellent use of such a tool.

A feature of congestion processor 12 is the ability to incorporate additional preference factors into aircraft density calculator 22 and bird density calculator 21. For example, specific bird density cells (subspaces) can be emphasized (biased upwards) or de-emphasized (biased downwards) based on prior knowledge of bird strikes, seasons, construction, radar coverage in those areas, et cetera. Similar adjustments can be made for aircraft densities (e.g. for volumes with greater risk, such as departure corridors). Risk correlator 23 can also include cell by cell modifications to emphasize certain volumes (subspaces) over others. The volumes to be emphasized could be those deemed to have greater a-priori risk, e.g. departure corridors.

In more complex embodiments, rather than simply counting intersecting tracks, the density function in a cell can be computed as the sum of the products of various risk factors for each intersecting track. The risk factors can include (radar-estimated) mass, speed and direction. Those skilled in the art can create any number of such density computations, using any available track measurements provided by the radars.

Mother feature of the present invention is the fact that the resulting congestion indicator 16 can be customized and applied uniquely to the risk posture of each aerodrome, flight crew and airline. Customized congestion indicator 16 thresholds (which require action if crossed) can be set by each stakeholder in accordance with the aircraft they are flying, the aerodrome they are visiting, or the risk posture they are comfortable assuming. This, and other features described herein make the congestion indicator 16 a key performance indicator (KPI) for aviation safety.

Analogous adjustments to aircraft density calculator 22, bird density calculator 21 and risk correlator 23 can be incorporated for other reasons such as making the calculated congestion indicator 16 more robust to varying environmental conditions (e.g. when birds are not flying during a particular update interval) and operating conditions (e.g. when there is a temporary lull in aircraft operations). Those skilled in the art will appreciate that to be useful, the congestion indicator 16 cannot change value wildly. These biasing adjustments will allow congestion indicator 16 to be optimized so that it can be used in an airport's safety management system and it can be actionable. These biasing adjustments can include baseline defaults, minima, maxima, ordered statistics and other linear and nonlinear filtering methods known to those skilled in the art.

Particular features of our invention have been described herein. However, simple variations and extensions known to those skilled in the art are certainly within the scope and spirit of the present invention. This includes variations on integration of the functional blocks described herein. For instance, FIG. 1 shows congestion processor 12 and display processor 13 as two separate processing components. It is obvious that these two components can be combined into a single component, or into more than two components, with complete flexibility on where the boundaries lie.

User interfaces 17 and 18 and system interface 19 can be implemented using all standard methods known to those skilled in the art. For example, Display processor 13 could use a Web server to provide indicator display 18 via a web browser accessible from any desktop or mobile device, alerts 17 could be text messages or e-mails, and interface 19 could be a database to database transfer.

What is claimed is:

1. A method for providing bird-aircraft strike risk information to airport stakeholders including pilots, comprising:
   operating one or more radars to continuously survey a predetermined airspace throughout an entirety thereof and continuously generate bird tracks and aircraft tracks of birds and any number of aircraft in said predetermined airspace;
   operating a congestion processor to receive said aircraft tracks and said bird tracks from said one or more radars and process them to periodically generate a risk matrix that indicates or indexes bird-aircraft strike risk separately in each of a multiplicity of cells or subspaces in said predetermined airspace; and
   communicating bird-aircraft strike risk in one or more of said cells or subspaces, pursuant to said risk matrix, to one or more users in said predetermined airspace.

2. The method in claim 1 wherein the operating of said one or more radars includes operating at least one avian radar and at least one air traffic control radar.

3. The method of claim 1 wherein at least one of said one or more radars is an Automatic Dependent Surveillance-Broadcast (ADS-B) system which generates said aircraft tracks.

4. The method of claim 1 wherein at least one of said one or more radars is a 3D avian radar.

5. The method of claim 4 where the operating of said one or more radars includes operating said 3D avian radar to generate two channels of track data, one of said two channels including said bird tracks and only said bird tracks, the other of the said two channels including said aircraft tracks and only said aircraft tracks.

6. The method of claim 1 where said aircraft tracks and said bird tracks are located in the said airspace in 3D, with each of said tracks specified respectively with coordinates {x, y, z, t} where x, y and z define a Cartesian coordinate system and t represents the current time.

7. The method of claim 1 wherein the operating of said congestion processor includes operating said congestion processor to calculate an updated value for said risk matrix at least once every few minutes based on most recently received aircraft tracks and bird tracks.

8. The method of claim 7 wherein the most recently received aircraft tracks and bird tracks for use by said congestion processor in calculating said updated value span respectively a duration in the tens of minutes, with respective updates to said aircraft tracks and bird tracks received from said one or more radars at least once every few seconds.

9. The method of claim 7, further comprising operating said congestion processor to periodically calculate a congestion indicator that measures congestion in said predetermined airspace taken as a whole, wherein the congestion indicator calculation includes summing, over the predetermined airspace, the cell-wise bird-aircraft strike risk.

10. The method of claim 1 wherein the operating of said congestion processor to periodically generate said risk matrix includes computing, for each given cell or subspace of the predetermined airspace, a sum of products of (i) the aircraft density of that given cell or subspace, (ii) the bird density of each of the other cells or subspaces, and (iii) a proximity function that is inversely proportional to the separation or distance between the given cell and the respective other cells in the predetermined airspace.

11. The method of claim 1 wherein the operating of said congestion processor to periodically generate said risk matrix includes computing, for each given cell or subspace of the entire aerodrome space, a sum of products of (i) the bird density of the given cell or subspace, (ii) the aircraft density of each of the other cells or subspaces, and (iii) a proximity function that is inversely proportional to the separation or distance between the given cell and the respective other cells in the predetermined airspace.

12. The method of claim 1 wherein the communicating of bird-aircraft strike risk in one or more of said cells or subspaces, pursuant to said risk matrix, to one or more users in said predetermined airspace is undertaken in real-time.

13. The method of claim 1, further comprising periodically organizing and storing said risk matrix, the communicating of bird-aircraft strike risk in one or more of said cells or subspaces, pursuant to said risk matrix, to one or more users in said predetermined airspace being undertaken as historical data mining or access at a time subsequent to the organizing and storing.

14. A real-time aircraft bird congestion indicator system for providing bird-aircraft strike risk information to airport stakeholders including pilots, comprising:
   one or more radars configured to continuously survey a predetermined airspace throughout an entirety thereof and continuously generate bird tracks and aircraft tracks of birds and any number of aircraft in said airspace; and
   a congestion processor operatively connected to said one or more radars,
   said congestion processor being configured to receive said aircraft tracks and said bird tracks and process them together to periodically determine for each cell of a preselected multiplicity of cells or subspaces of said predetermined airspace a respective aircraft density and a respective bird density, collectively constituting an aircraft density function and a bird density function respectively over or across said predetermined airspace, and to generate a risk matrix that identifies aircraft bird strike risk in each of said cells or subspaces of said predetermined airspace separately,
   wherein said congestion processor includes a risk correlator configured to calculate said risk matrix by multiplying densities of all possible cell-pairs of the aircraft density function and the bird density function and multiplying these products by a proximity function that is inversely proportional to the respective cell-to-cell separation in the airspace.

15. The system of claim 14 wherein said one or more radars include at least one avian radar and one air traffic control radar.

16. The system of claim 14 wherein at least one of said one or more radars is an Automatic Dependent Surveillance Broadcast (ADS-B) system which generates said aircraft tracks.

17. The system of claim 14 wherein at least one of said radars is a 3D avian radar.

18. The system of claim 17 where said 3D avian radar is configured to generate two channels of track data, one of said channels configured to generate said bird tracks and the second channel configured to generate said aircraft tracks.

19. The system of claim 14 where said aircraft tracks and said bird tracks are located in the said airspace in 3D, with each of said tracks specified respectively with coordinates {x, y, z, t} where x, y and z define a Cartesian coordinate system and t represents the current time.

20. The system of claim 14 wherein said risk matrix is generated at least once every few minutes and calculated based on the most recently received aircraft tracks and bird tracks which span respectively a duration in the tens of minutes, with respective updates to said aircraft tracks and bird tracks received from said radars at least once every few seconds.

21. The system of claim 14 wherein said congestion processor includes a summer operatively connected to said risk correlator to periodically calculate a congestion indicator that measures congestion in said predetermined airspace taken as a whole, wherein the summer is configured to add, over the predetermined airspace, the cell-wise bird-aircraft strike risk.

22. A method for measuring congestion between aircraft and birds in a predetermined airspace in real-time to provide bird-aircraft strike risk information to airport stakeholders including pilots, comprising:
   operating one or more radars to continuously survey said predetermined airspace throughout an entirety thereof and continuously generate bird tracks of birds in said predetermined airspace and aircraft tracks of any number of aircraft in said predetermined airspace;
   operating a congestion processor to receive said aircraft tracks and said bird tracks from said one or more radars and to process them to periodically generate a risk matrix that measures bird-aircraft strike risk separately in each of a multiplicity of cells of said predetermined airspace; and
   periodically storing the risk matrix to build a historical database accessible for understanding bird-aircraft strike probabilities in said predetermined airspace in accordance with time.

23. The method of claim 22, further comprising operating the congestion processor to periodically sum the bird-aircraft strike risk over all the cells of said predetermined airspace to generate a congestion indicator for the entirety of said predetermined airspace, also comprising storing periodically storing the congestion indicator in the historical database.

24. The method of claim 22 wherein the operating of said congestion processor to generate said risk matrix includes calculating for each of said cells a product of an aircraft density function and a bird density function, selectively using said aircraft tracks and said bird tracks, and further multiplied by a proximity function that is inversely proportional to cell-wise separation in the airspace.

25. The method of claim 22 wherein the operating of said congestion processor to periodically generate said risk matrix includes computing, for each given cell or subspace of the predetermined airspace, a sum of products of (i) the aircraft density of that given cell or subspace, (ii) the bird density of each of the other cells or subspaces, and (iii) a proximity function that is inversely proportional to the separation or distance between the given cell and the respective other cells in the predetermined airspace.

26. The method of claim 22 wherein the operating of said congestion processor to periodically generate said risk matrix includes computing, for each given cell or subspace of the entire aerodrome space, a sum of products of (i) the bird density of the given cell or subspace, (ii) the aircraft density of each of the other cells or subspaces, and (iii) a proximity function that is inversely proportional to the separation or distance between the given cell and the respective other cells in the predetermined airspace.

* * * * *